C. H. BRADSHAW.
DRAFT EQUALIZER.
APPLICATION FILED APR. 26, 1915. RENEWED MAY 26, 1916.
1,206,663.
Patented Nov. 28, 1916.
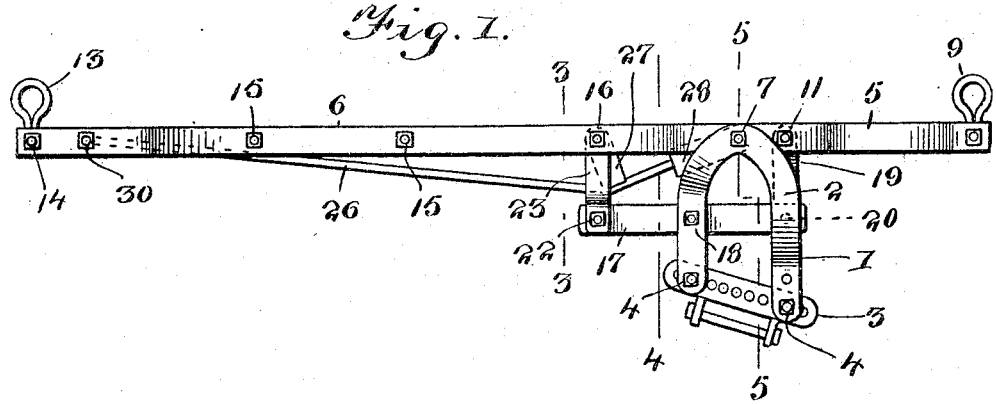
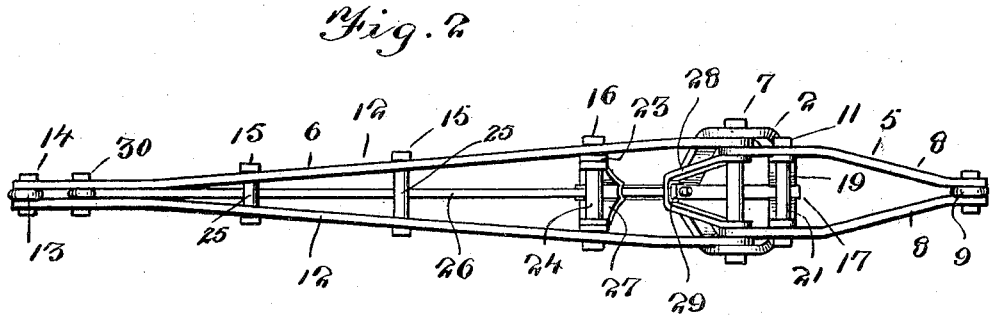
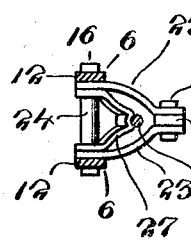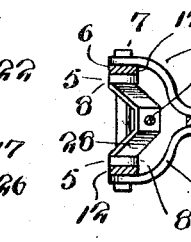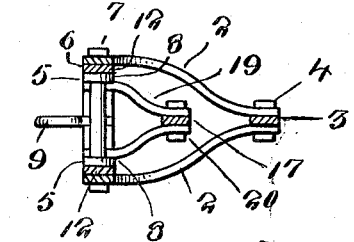
Inventor
C. H. Bradshaw
Witnesses
By Victor J. Evans
Attorney

UNITED STATES PATENT OFFICE.

CLINTON H. BRADSHAW, OF PRAIRIE DEPOT, OHIO.

DRAFT-EQUALIZER.

1,206,663.   Specification of Letters Patent.   Patented Nov. 28, 1916.

Application filed April 26, 1915, Serial No. 23,977. Renewed May 26, 1916. Serial No. 100,158.

*To all whom it may concern:*

Be it known that I, CLINTON H. BRADSHAW, a citizen of the United States, residing at Prairie Depot, in the county of Wood and State of Ohio, have invented new and useful Improvements in Draft-Equalizers, of which the following is a specification.

This invention is an improved draft equalizer especially adapted for four horse plow teams and in which the horses walk abreast, the object of the invention being to provide an improved draft equalizer of this kind which enables one horse to travel in the furrow and the other horses to walk on the land while plowing, the device also serving to equally distribute the load among the horses.

The invention consists in the construction, combination and arrangement of devices hereinafter described and claimed.

In the accompanying drawings, Figure 1 is a plan of a draft equalizer constructed in accordance with my invention, with parts removed to disclose subjacent construction. Fig. 2 is a front elevation of the same. Fig. 3 is a transverse sectional view of the same on the plane indicated by the line 3—3 of Fig. 1. Fig. 4 is a similar view on the plane indicated by the line 4—4 of Fig. 1. Fig. 5 is a similar view on plane indicated by the line 5—5 of Fig. 1.

In accordance with my invention I provide a yoke 1 which comprises a pair of U-shaped members 2 the arms of which at their rear ends are secured on opposite sides of a clevis 3 by means of bolts 4. The front portions of the members of the yoke diverge vertically, and between their front ends the inner ends of a short draft bar 5 and a long draft bar 6 are pivotally mounted on a bolt 7, said bolt being vertically arranged. The draft bar 5 comprises a pair of members 8 which have an attaching link or ring 9 secured between their outer ends, their inner ends diverging. These members 8 are connected together at a point a suitable distance from the inner ends by a bolt 11. The long draft bar 6 comprises a pair of members 12 having an attaching link or ring 13 secured between their outer ends by a bolt 14. These members 12 are connected together by bolts 15 and are also connected together, at a point a suitable distance from their inner ends by a bolt 16.

A lever 17 is pivotally mounted between the members 2 of the yoke 1 at a point, on one side of the yoke by a bolt 18 which pivot bolt is substantially midway between the ends of said lever. One end of said lever is connected by a pair of forked links 19 to the draft bar 8 by the bolt 11, the inner ends or rear ends of said draft links being pivotally connected to said lever by a bolt 20. A spacer tube or sleeve 21 is placed on the bolt 11 and serves to space the upper ends of the links 19 and to also hold the members 8 of the draft bar 5 in the desired spaced relation.

The other end of the lever 17 is pivotally connected by a bolt 22 to a pair of forked links 23, the front ends of which are pivotally connected to the draft bar 6 by the bolt 16. A sleeve 24 which is on said bolt serves as a spacer. The bolts 15 are also provided with spacer sleeves 25.

The long draft bar or arm 6 has a truss on its rear side to strengthen it, said truss comprising a rod 26, a strut 27 and a link 28. The link and the strut are substantially U-shaped and are respectively secured on the bolts 7 and 16, the inner end of the rod having threaded connection with the link 28 and being provided with a tensioning nut 29. The outer end of said rod is attached to a bolt 30 which connects the members 12 of the draft bar 6 at a point near their outer ends.

It will be noted that the bolt 11 which connects the links 19 to the draft arm 5 is only one-third as far from the common pivot bolt 7 of the bars 5 and 6 as the bolt 16 which pivotally connects the links 23 to said bar 6. It will also be noted that the distance between the pivot bolts 20, 22 of the lever 17 is equal to the distance between the bolts 16 and 11. Hence the draft is equally distributed to the horses. The proportions may be varied as desired to secure the desired results.

Having thus described my invention I claim:—

The herein described draft equalizer comprising a yoke, a short draft bar and a long draft bar extending from opposite sides of the yoke, pivotally connected thereto and having a common pivot axis, a lever pivotally connected to that side of the yoke from which the long draft bar extends and links connecting the opposite ends of said lever respectively to the short and long draft arms, the pivotal connections between said links and said draft arms being at unequal distances from the common pivot of said draft bars, the said yoke comprising a pair of U-shaped members having their central or front portions spaced apart, a clevis secured between the arms of the members of the said yoke and each of the said draft bars comprising a pair of spaced inwardly diverging members, the pivot connection between said draft bars and the members of the yoke being a bolt, the pivot connections between the links and the draft bars also being bolts, each of said bolts having a spacer sleeve, and the said longer arm also having a truss comprising a rod having its outer end attached thereto, a U-shaped link connecting the inner end of said rod to the common pivot bolt of said draft bars and a U-shaped strut attached to the pivot bolt which connects the links of the long lever bar.

In testimony whereof I affix my signature in presence of two witnesses.

CLINTON H. BRADSHAW.

Witnesses:
J. F. WOLLAM,
NETTIE M. WOLLAM.

Copies of this patent may be obtained for five cents each, by addressing the "Commissioner of Patents, Washington, D. C."